३,६००,४९३
METHOD FOR DRAWING FIBERS COMPRISED OF CELLULOSE ACETATE-POLYMER BLENDS
Michael Maurice Besso, West Orange, N.J., assignor to Celanese Corporation, New York, N.Y.
No Drawing. Filed Oct. 7, 1968, Ser. No. 765,639
Int. Cl. B29c 25/00; D01d 5/12
U.S. Cl. 264—210                                                    9 Claims

ABSTRACT OF THE DISCLOSURE

Strong shaped articles containing a cellulose ester blended with a synthetic reinforcement polymer can be prepared by drawing in an organic fluid selectively absorbed by said cellulose ester.

BACKGROUND OF THE INVENTION

This invention relates to cellulose acetate-containing fibers and a process for the preparation thereof. More particularly, the invention relates to cellulose acetate-containing fibers possessing improved physical properties, particularly with respect to tensile strength, formed from a blend of normally undrawable cellulose acetate homogeneously admixed with a reinforcing, fiber-forming component, said blend being drawable in a particular drawing medium into a tenacious fiber exhibiting the highly desirable physical and chemical properties of cellulose fibers, i.e., minimal tendency to acquire an electrostatic charge, excellent dyeability, good washability, and the like, in combination with the superior tensile strength and elongation values of synthetic polymer fibers.

It is known that fibers can be prepared from blends of cellulose esters, particularly cellulose acetate, cellulose acetate-butyrate and the like, with certain hydrophobic fiber-forming polymers such as polyacrylonitrile, polyvinyl chloride, polyvinylidene chloride and copolymers of acrylonitrile with vinyl and/or vinylidene chloride. The synthetic fibers heretofore made from the above and similar cellulose ester—synthetic fiber-forming polymer blends have been deficient in certain respects, notably tensile strength, preventing their employment in many textile manufacturing processes, i.e., knitting and weaving operations. Extremely low tensile and elongation at the break values are particularly evident in prior art fibers formed from polymeric blends containing a high percentage by weight, i.e., 60 to 70 and above, of cellulose acetate.

Generally, fiber and film-forming polymeric blends, following extrusion, may be drawn by a variety of methods into strong shaped articles for a pre-selected elongation. However, blends containing a high ratio by weight of cellulose acetate cannot be drawn utilizing conventional fiber drawing techniques such as hot melt attenuation and/or subsequent further orientation through dry heat or steam under atmospheric pressure conditions or by passage over a hot object with concomitant stretching. Under such operating conditions, the cellulose acetate rapidly rigidifies following extrusion preventing the drawing of the blend as a homogeneous fiber-forming unit. Blends of high cellulose acetate content can be drawn in steam under high pressure conditions of the orders of 15 to 20 p.s.i.g. to produce fibers having good tenacities but elongations which are too low for conventional textile use and particularly for knitting and weaving operations.

Therefore, it is an object of the present invention to provide useful shaped articles, especially fibers and films, made from high cellulose acetate-content polymeric blends having tenacities and elongations at the break suitable for textile use. It is another object of the invention to provide a process enabling the drawing of blends of cellulose acetate with a synthetic fiber-forming polymer to prepare fibers having the desirable properties of both polymers in a high tensile strength composite. A further object of the invention is to provide a process for drawing blends of fiber-forming polymers containing 60 to 80 percent by weight cellulose acetate in a particular drawing medium which swells the cellulose ester without impairing drawability of the other blend components to allow the preparation of fibers comprising an intimate uniform dispersion of cellulose acetate fibrils throughout a continuous matrix of other polymeric blend components. A specific object of the invention is to provide fibers of cellulose acetate-polypropylene wherein the polypropylene comprises at least 30, preferably 40 percent of the fiber by volume, i.e., about 50 to 80 percent cellulose acetate by weight depending upon density of polymers, possessing tenacities and elongations sufficiently high for textile use. Other objects of the invention will appear obvious to those of skill in the art from the detailed description of the invention hereinafter.

THE INVENTION

In accordance with the invention tenacious cellulose ester-containing shaped articles are prepared by extruding a blend of a cellulose ester with a synthetic fiber and/or film-forming reinforcement polymer and drawing the same in a medium selectively absorbed by said cellulose ester. Shaped articles produced by the invention for example, may be fibers and films. In the latter instance, following the initial drawing operation, the films may be fibrillated according to procedures well known in the art to produce novel yarn-like materials.

In accordance with one preferred embodiment of the invention, cellulose acetate fibers containing at least 40 percent by volume of a synthetic, fiber-forming, reinforcement polymeric component may be readily drawn in a drawing medium comprising an organic fluid substantially inert to the non-cellulosic blend components which penetrates and swells cellulose acetate. The drawing fluid is absorbed by the celluose acetate, sufficient quantities thereof penetrating the polymer to uniformly distend and rupture the initially continuous cellulosic phase during the stretching operation. The reinforcing polymer, since it is not deleteriously affected by the drawing medium, remains in a continuous phase throughout the drawing operation, maintaining the integrity of the fiber.

In a preferred embodiment of the invention, the drawing medium is a liquid or gaseous halogenated compound of 1 to 8 carbon atoms containing, in addition to the halogen atoms, at least one hydrogen atom and preferably, is selected from compounds containing 1 carbon atom and 1 to 3 chlorine atoms, i.e., methyl chloride, methylene chloride and chloroform.

The fiber resulting from the process of the invention contains up to 70, preferably 60, percent by volume fibrillar cellulose acetate dispersed uniformly throughout a matrix of at least 30, preferably 40, percent by a volume of a continuous synthetic reinforcement polymeric fiber and advantageously combines the desired properties of the two phases in a tenacious fiber readily processable through conventional textile fabrication operations.

DETAILED DESCRIPTION

Cellulose acetate yarn, including filament and staple, possesses numerous desirable properties accounting for the widespread use thereof in textile end products such as lingerie, dresses, draperies, linings, upholstery, carpets, bathing suits, blouses, umbrellas, and the like. Acetate fabrics are fast-drying, wrinkle and shrinkage resistant, crisp or soft in hand depending upon the end use, and luxurious in appearance. However, certain factors have restricted an even greater usage of cellulose acetate. Most noted of these are the comparatively high density of cellulose acetate fibers with respect to acrylics, nylons, and most polyesters which gives to an acetate fabric a weight higher than that of similar fabrics made from many other fibers and the comparatively low tenacity of cellulose acetate, particularly the wet tenacity, which is distinctly inferior to tenacities of the synthetic polymer fibers. Typically, cellulose acetate, filament and staple, has a density of about 1.32 and a tenacity in the range of about 1.2 to 1.5 dry and 0.8 to 1.2 wet. On the other hand, the most widely used synthetic polymer fibers, acrylic, nylon, olefin (polypropylene) and the majority of the polyesters possess significantly higher dry and wet tenacities coupled with substantially lower densities. While the above synthetic polymers can be drawn to produce strong fibers having good elongations, cellulose acetate cannot be drawn utilizing conventional drawing techniques. When cellulose acetate is drawn by unorthodox procedures, such as in the presence of high pressure steam, tenacities of the drawn and oriented fibers can be increased but elongation, if affected at all, suffers, and in many instances shows a decrease in value nearly directly related to the increase gained in tenacity.

The present invention enables the production of fibers of high cellulose acetate content containing at least 30, preferably 40 percent by volume of a synthetic fiber-forming polymer component possessing the desired properties of the hydrophilic cellulose acetate in combination with the high tensile properties of the synthetic fibers. The synthetic fiber-forming polymer forms a continuous, unitary fiber matrix throughout which the cellulose acetate is uniformly dispersed in intimate relationship therewith in the form of short, staple-like fibers.

The desingation "synthetic fiber-forming polymer" and the like as used herein and in the appended claims refers generally to synthetic, as opposed to naturally occurring, polymers from which man-made fibers are produced and includes blends of two or more such polymers. As examples of synthetic fiber-forming polymers, there may be mentioned polyacrylonitriles, polyamides, polyolefins, polyesters, polyurethanes, polyvinyl halides, polyvinylidene halides and blends thereof. Of course, included within the above are the various fiber-forming copolymers thereof. Of particular interest with respect to the present invention are synthetic fiber-forming polymers normally employed in the production of acrylic, nylon, olefin and polyester fibers. In a like manner the term "cellulose ester" as used herein and in the appended claims is intended to include within its scope cellulose esters prepared from 2 to 4 carbon atom carboxylic acids, i.e. cellulose acetate, both secondary and triacetate, cellulose propionate, cellulose butyrate and mixtures thereof. Of course, the various copolymeric esters are similarly encompassed by the terminology employed herein.

The drawing medium of the present invention is selected from organic fluids, particularly liquids, which are absorbed by cellulose acetate fibers and swell the same without adversely affecting the structural integrity and drawability of the reinforcement polymeric component; that is, organic liquids which are imbibed within and distend cellulose acetate while remaining substantially inert toward other synthetic hydrophobic fibers. As examples of such organic fluids, there may be mentioned halogenated compounds of 1 to 8 carbon atoms containing at least 1 hydrogen atom. Of particular interest are the one carbon atom halogenated organic solvents also containing at least one hydrogen atom. Preferably, the drawing medium is a fluorinated and/or chlorinated compound, and most preferably, is selected from methyl chloride, methylene chloride and chloroform and mixtures thereof.

As the cellulose acetate content of the fiber is increased toward the maximum percentage by weight possible within the defined volume ratios hereinbefore set forth, i.e., over about 70 percent by weight where permissible, it is at times advantageous to employ a diluent with the drawing medium due to the somewhat uncontrollable swelling of cellulose acetate within the extruded fiber at high cellulose acetate concentrations which results in poor uniformity of dispersion thereof throughout the reinforcement fiber matrix. By diluting the drawing medium with a compatible inert fluid which is not absorbed by cellulose acetate, i.e., about 20 to 60 percent by volume benzene or toluene, the rate of penetration of the absorbable fluid is lowered sufficiently to assure the preparation of a uniform product.

The cellulose acetate should be thoroughly mixed with the reinforcement component to form a homogeneous blend prior to extrusion. Although blending for dry and wet spinning may be accomplished in a powder blender such as a Banbury mixer at slightly elevated temperatures, it is preferable to mix the ingredients by passage through a screw extruder. For melt extrusion melt blending may be accomplished in a suitable apparatus at elevated temperatures, i.e., a Brabender Plastigraph operating at 265° C. for 6 minutes at 30 r.p.m.

The homogeneous blends may be formed into mono- or multifilaments by means of dry, wet or melt spinning techniques. The filamentous extrudate, as it emerges from the die exit, is immersed in the drawing medium and elongated therein to form a tenacious fiber. The drawing medium may be either in the liquid or gaseous state depending upon its boiling point and the temperature of drawing, the latter varying between the solidification temperature of the drawing fluid and/or the temperature at which the extrudate loses its extensibility up to the temperature at which the extrudate swells uncontrollably resulting in inefficient drawing and breakage. In a like manner, conjugate fibers in which the cellulose ester blend forms one component thereof my be extruded to be subsequently drawn in accordance with the invention into useful novelty yarns.

During the drawing operation, the reinforcing polymer is highly oriented, giving the desired tensile properties to the product with concomitant loss of substantially all orientation in the cellulose acetate. With multifilament spinning there is some tendency for adjacent filaments to coalesce during drawing in certain of the organic drawing fluids, particularly methylene chloride. However, the individual fibers separate when the multifilament is passed over a sharp edge.

At times, again depending upon the particular drawing fluid, the cellulose acetate may appear to completely dissolve. This is because of the high rate of absorption into the cellulose acetate of the drawing fluid. As long as the minimum operable volume percent of reinforcement polymer is maintained in the blend, final fiber structural integrity is not lost. As disclosed hereinbefore, it may be desirable to dilute the drawing medium with an inert fluid in such instance to maintain product uniformity.

The following examples are presented to illustrate certain embodiments of the invention without intending in any manner to limit the scope thereof. In the examples, all percentages are by weight unless otherwise indicated. All blends used in the examples are thoroughly mixed to form a homogeneous feed by passage through a 20 inch extruder equipped with either a nylon or two stage vented screw unless otherwise stated. The cellulose acetate is unplasticized flake acetate prepared from cotton linters subsequently acid filtered and pressure stabilized.

EXAMPLE I

In accordance with the invention, monofilaments of cellulose acetate/polypropylene 60/40 are melt spun by means of a micromelt spinning apparatus ($L/D=1.3$, 14 mils diameter spinnerette) at 260° C. with a take-up speed of 135 meters per minute. Tensile properties of the as-spun fiber and after drawing in methylene chloride at 38° C. are tabulated in Table I.

TABLE I

| | Denier | Elongation at the break (percent) | Tenacity (g./d.) |
|---|---|---|---|
| As-spun filament | 21 | 5 | 1.7 |
| After drawing in CH₂Cl₂ | 5.7 | 94.9 | 2.12 |

Residence time in the drawing bath may vary widely and will depend upon other process operating parameters, especially temperature, draw ratio, specific polymeric blend and die shape and dimensions. Typical drawing bath residence times will be of the order of 10 to 20 seconds for high speed, high draw ratio processes and up to 1 to 2 minutes for low draw ratios. To a degree, there is an inverse relationship between bath temperature and exposure time, the latter decreasing as temperature approaches the vaporation point. Within these limits, one skilled in the art can readily determine optimum exposure for a given set of process conditions.

While the fiber blends of the invention have been described with respect to a certain minimum volume content of reinforcement polymeric component, it should be noted that low weight percentages of cellulose ester component are contemplated in addition to the preferred embodiment fibers containing a high weight percent of cellulose ester. For example, fibers may be extruded and drawn in accordance with the teachings herein containing only 10 percent by weight cellulose acetate although they will typically contain over 50 percent by weight cellulosic polymer.

EXAMPLE II

Example I is repeated with blends containing higher weight percents of cellulose acetate with equally good results. For instance, cellulose acetate/polypropylene 70/30 can be drawn 200% in methylene chloride at 38° C. into a fiber having a tenacity of 1.6 g./d. and elongation at the break of 36.7%.

EXAMPLE III

This example further illustrates the pronounced increase in tensile properties, particularly elongation, obtainable with the present invention. Cellulose acetate/polypropylene 60/40 at a feed rate of 5 gm./minute is extruded through a conventional melt spinning unit having a 15 mil diameter, 20 hole spinnerette at 270° C. with a maximum take up of 100 inches/minute. The multifilament yarn is drawn while immersed in a medium of methylene chloride at temperatures both below and above the boiling point (about 40° C.) thereof. The tensile properties of the yarn as-spun and after drawing at various temperatures are tabulated in Table II.

TABLE II

| | Denier | Tenacity, g./d. | Elongation at break (percent) |
|---|---|---|---|
| As-spun | 57.5 | 0.98 | 5.28 |
| Drawn at: | | | |
| 20° C | 19.8 | 1.60 | 61.3 |
| 30° C | 19.1 | 1.62 | 69.1 |
| 36° C | 15.7 | 1.71 | 64.2 |
| 50–60° C | 11.9 | 2.41 | 55.9 |

Example III demonstrates the excellent tensile properties of the drawn yarn and the high percentage increase in tenacity (with minimal decrease in elongation) realized by drawing in vaporous methylene chloride.

EXAMPLE IV

In accordance with the procedure of Example I, cellulose acetate/nylon 6, 65/35, and cellulose acetate/polyester, 60/40 are extruded into monofilaments having the as-spun and postdrawing (methylene chloride at 38° C.) tensile properties as set forth in Table III.

TABLE III

| Fiber | Denier | Tenacity, g./d. | Elongation at break (percent) |
|---|---|---|---|
| CA/N as-spun | 60.1 | 1.26 | 3.71 |
| CA/N drawn | 19.6 | 1.78 | 56.1 |
| CA/PE as-spun | 85.4 | 1.44 | 4.63 |
| CA/PE drawn | 21.7 | 1.13 | 30.7 |

NOTE.—CA/N=cellulose acetate/nylon 6, 65/35; CA/PE=cellulose acetate/polyester 60/40.

The above examples are repeated in other halogenated hydrocarbons drawing mediums with equally good results.

As disclosed hereinbefore, filaments produced in accordance with the present invention contain short staple-like fibrils of cellulose ester dispersed throughout a continuous filament of synthetic fiber-forming polymer. It has been found that monofilaments containing at least 30 percent by volume synthetic reinforcement polymer contain a discontinuous fibrillar acetate phase having a tenacity between about 0.54 and 0.58 g./d. and an elongation at the break of between about 3.0 and 3.8 percent. For example, the polypropylene/cellulose acetate fibers produced in accordance with the examples as presented hereinbefore leave an acetate residue, following suspension in refluxing vapors of xylene, having a tenacity of 0.56 and an elongation of 3.3 percent. Further, studies have shown that the individual acetate fibrils have an average diameter of .06 to 0.2 micron.

The fibers produced according to the invention, due to the cellulose acetate content, will absorb close to 6 percent moisture, which is the normal moisture retention of cellulose acetate. Fabrics prepared from such fibers may be readily laundered, having a high retention of strength when wet, and safely ironed. Additionally, the fibers are slightly opaque rendering them suitable for many fabric applications normally limited to certain of the natural fibers, i.e., cotton and wool.

Numerous modifications within the spirit of the invention will appear obvious to those of ordinary skill in the art.

What is claimed is:

1. A process for producing a drawn fiber or film composed of cellulose ester fibrils dispersed in a continuous synthetic polyacrylonitrile, polyamide, polyolefin, polyester, polyurethane, polyvinylhalide or polyvinylidine halide polymer fiber or film shaped article matrix which comprises blending at least about 10 weight percent of fibril-formable cellulose ester with said synthetic film or fiber-formable polymer to form an extrudable blend; extruding said blend to form a continuous phase of said cellulose ester and synthetic polymer in the form of a fiber or film shaped article; drawing said shaped article while simultaneously exposing said shaped article in an organic fluid selectively absorbed by said cellulose ester to swell said cellulose ester without impairing the drawability of said synthetic polymer into a continuous phase and continuing said drawing and swelling treatment until said cellulose ester phase ruptures to form a plurality of cellulose ester fibrils dispersed in a continuous phase of said synthetic polymer in the form of a fiber or film shaped article.

2. The process of claim 1 wherein the cellulose ester is cellulose acetate and the shaped article is a fiber.

3. The process of claim 2 wherein said fiber contains not more than 70 percent by volume cellulose acetate.

4. The process of claim 3 wherein the synthetic fiber-forming polymer is selected from the group consisting of polypropylene, polyamide and, polyester and copolymers, 5. The process of claim 2 wherein said fluid is selected from halogenated compounds containing 1 carbon atom and at least one hydrogen atom.

6. The process of claim 5 wherein the compound is a chlorinated compound.

7. The process of claim 6 wherein the compound is methylene chloride.

8. The process of claim 7 wherein the methylene chloride is in the liquid phase.

9. The process of claim 7 wherein the methylene chloride is in the vaporous phase.

References Cited

UNITED STATES PATENTS

| | | | |
|---|---|---|---|
| 1,955,793 | 4/1934 | Dreyfus | 264—343 |
| 2,061,565 | 11/1936 | Dreyfus | 264—343 |
| 2,062,405 | 12/1936 | Dreyfus | 264—343 |
| 2,071,250 | 2/1937 | Carothers | 260—106 |
| 2,142,389 | 1/1939 | Weissenberg et al. | 264—343 |
| 2,287,099 | 6/1942 | Hardy | 264—168 |
| 2,321,635 | 6/1943 | Taylor | 264—290 |
| 2,324,397 | 7/1943 | Hull | 264—176 |
| 2,509,740 | 5/1950 | Miles | 264—290 |
| 3,215,486 | 11/1965 | Hada et al. | 8—74 |
| 3,233,019 | 2/1966 | Adams | 264—290 |
| 2,954,587 | 10/1960 | Rasmussen. | |
| 3,003,304 | 10/1961 | Rasmussen. | |
| 3,499,822 | 3/1970 | Rasmussen. | |

JAY H. WOO, Primary Examiner

U.S. Cl. X.R.

260—13; 264—288, 290, 343, Dig. 47